United States Patent [19]
Elfert et al.

[11] 4,069,215
[45] Jan. 17, 1978

[54] SEMIPERMEABLE MEMBRANES OF SULPHONATED POLYBENZ-1,3-OXAZIN-2,4-DIONES

[75] Inventors: Klaus Elfert; Jürgen Hinz; Rudolf Binsack, all of Krefeld, Germany

[73] Assignee: Bayer Aktiengesellschaft, Germany

[21] Appl. No.: 713,142

[22] Filed: Aug. 10, 1976

[30] Foreign Application Priority Data

Aug. 16, 1975 Germany .............................. 2536492

[51] Int. Cl.$^2$ ...................... B01D 39/00; C08J 5/18; C08L 79/04
[52] U.S. Cl. ........................... 260/79.3 R; 210/321 R; 210/500 M
[58] Field of Search ......... 260/79.3 R, 47 CP, 47 CB; 210/500 M, 321 R

[56] References Cited

U.S. PATENT DOCUMENTS

| 3,016,368 | 1/1962 | Gallagher | 260/79.3 R |
|---|---|---|---|
| 3,379,686 | 4/1968 | Bottenbruch et al. | 260/47 CP |
| 3,510,454 | 5/1970 | Bottenbruch et al. | 260/47 CB |
| 3,541,048 | 11/1970 | Binsack et al. | 260/47 CB |
| 3,839,283 | 10/1974 | Binsack | 260/47 CP |
| 3,960,821 | 6/1976 | Vogt et al. | 260/79.3 R |
| 3,970,630 | 7/1976 | Cohen et al. | 260/47 CP |
| 3,998,871 | 12/1976 | Carlson | 260/47 CB |

FOREIGN PATENT DOCUMENTS

| 1,393,470 | 5/1975 | United Kingdom | 260/47 CB |

Primary Examiner—Ronald W. Griffin
Attorney, Agent, or Firm—Connolly and Hutz

[57] ABSTRACT

Semipermeable membranes of sulphonated polybenz-1,3-oxazin-2,4-diones for separating or enriching organic sulphonates by the method of inverse osmosis or ultrafiltration.

3 Claims, No Drawings

SEMIPERMEABLE MEMBRANES OF SULPHONATED POLYBENZ-1,3-OXAZIN-2,4-DIONES

This invention relates to semipermeable membranes of sulphonated polybenzoxazin diones and to their use for inverse osmosis and ultrafiltration.

Inverse osmosis and ultrafiltration are mass separation techniques which are particularly economical by virtue of the low energy costs involved. Thus in this method of mass separation, in contrast to separation by distillation, the solvent does not undergo any change of phase and the separation is normally carried out at ambient temperature.

The principle of inverse osmosis has long been known. Inverse osmosis is an operation whereby a solvent migrates from a solution of relatively high concentration through a semipermeable membrane into a solution of lower concentration under the effect of an applied pressure which is greater than the osmotic pressure of the system. In this way, dissolved substances, for example, can be separated from the solvent.

Examples of the commercial application of this separation technique are the desalination of sea water or brackish water, the purification of contaminated water for producing drinking water or industrial water, and also the concentration, removal or recovery of a variety of different substances from aqueous solutions, such as for example the concentration of foods or the separation or concentration of biological or pharmaceutical products.

At the present time the membranes used in industrial inverse osmosis installations are primarily membranes of cellulose acetate and aromatic polyamides.

Unfortunately, cellulose acetate membranes have certain disadvantages in regard to their chemical and thermal stability. They are readily hydrolysed under acid or alkaline conditions and are degraded by microorganisms. This gradually results in a deterioration of the filtration properties and in a limited service life. Asymmetrical membranes are also produced from aromatic polyamides. They are superior to cellulose acetate membranes, especially in their resistance to chemical and thermal influences.

The selective separation of various substances with molecular weights below 500 is not possible with membranes of the aforementioned materials, because in cases where a so-called "tight" membrane is used, as for example in the desalination of sea water, all the low molecular weight substances are largely retained, whereas in cases where membranes having higher separation limits, for example ultrafiltration membranes, are used substances of this kind pass through the membrane.

It has now been found that membranes of sulphonated polybenzoxazin diones are distinguished by their high selectivity, in other words these membranes are able to retain certain substances, namely those of only low molecular weight. Accordingly, these membranes may be used for separating various components from a solution, preferably from aqueous solution. The substances present therein may be salts and organic compounds of low molecular weight (<500). The membranes according to the invention may be used with advantage for the removal of certain organic substances, preferably sulphonates, from their solutions by the process of inverse osmosis. Another advantage of these membranes is that they have little or no capacity for retaining inorganic salts. In general, effluents not only contain organic constituents, but in many cases have high salt contents as well. Any enrichment of the salt would prevent the application of inverse osmosis because of the high osmotic pressure which concentrated salt solutions generate. Since the membranes according to the invention have little or no capacity for retaining salts, they may be used for separating certain organic substances from solutions containing salts. In this way, it is possible for the first time to separate off certain substances by means of semipermeable membranes. For example the removal of undesirable substances from effluents is possible without the application of inverse osmosis being prevented by excessive salt contents of the solution introduced. The removal of chemical compounds from industrial effluents is a problem of considerable importance. In addition to removing substances which pollute waters, and to purifying the effluent by means of semipermeable membranes, it is possible both to enrich and to recover a variety of different substances from production processes. For example, the removal of sulphonates from effluents is of interest. Sulphonates are widely used as washing agents and wetting agents, as emulsifiers and dispersion aids, and their removal from effluents if often very desirable. The substances which may be separated off from aqueous solutions by the membranes according to the invention include, in particular, $C_{12}$–$C_{18}$ alkyl and alkylaryl mono- or disulphonates such as sodium-dodecyl benzene sulphonate and also lignin sulphonates. For example, it is possible by using these selective membranes to remove sulphonates from NaCl-containing solutions, the sodium chloride largely passing through the membrane, whilst the sulphonates are retained, so that the sulphonates are thus separated from the inorganic salt.

In addition, the membranes produced from sulphonated polybenzoxazin diones are distinguished by their very high chemical, thermal and mechanical stability. They are resistant to hydrolysis in a pH range of from 1 to 9 and are thermally stable at temperatures of up to 150° C. Accordingly, they have a high efficiency and a long service life.

The present invention relates to semipermeable membranes of sulphonated polybenz-1,3-oxazin-2,4-diones with an acid number of from 1 to 800, preferably from 5 to 500 and, with particular preference, from 5 to 250, containing the recurring structural unit:

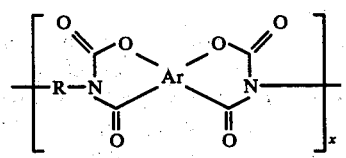

in which R represents a radical corresponding to the general formulae (I) or (II):

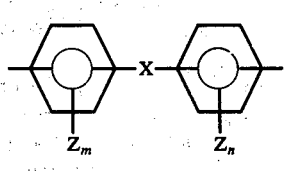

(I)

(II)

-continued

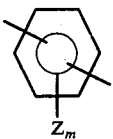

where X is a bond or a bridge member of the formula

—O—, —S—, —SO$_2$—, —C(CH$_3$)$_2$—, or —CH$_2$—;

Ar represents a radical of the general formulae (III) to (V):

(III)

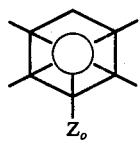

(IV)

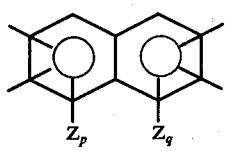

(V)

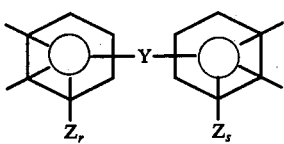

Y is a bond or a bridge member corresponding to the formula —O—, —S—, —CH$_2$—, —SO$_2$—, or —CO—; Z is an —SO$_3$H-group or a sulphonic acid salt of an alkali or alkaline earth metal or of an organic amine; $m$, $n$, $o$, $p$, $q$, $r$, $s$ may be the same or different and $m$ and $n$ represent an integer from 0 to 4, $o$, $p$ and $q$ represent an integer from 0 to 2 and $r$ and $s$ represent an integer from 0 to 3 with the provision that $m$, $n$, $o$, $p$, $q$, $r$ and $s$ cannot all be 0 simultaneously, and $x$ is in the range of from 10 to 200.

The sulphonated polybenzoxazin diones have a relative viscosity $\eta_{rel}$ as measured on a 0.5% by weight solution in dimethyl formamide at 25° C, of from 0.7 to 3.5. Their molecular weight $M_n$, as measured by the osmotic method (in m-cresol), is in the range of from 5000 to 100,000.

These sulphonated polybenzoxazin diones are obtained by sulphonating the corresponding polybenzoxazin diones which may be obtained by known processes of the type described, for example, in German Pat. No. 1,495,839 corresponding to U.S. Pat. No. 3,379,686 and in German Offenlegungsschrifts Nos. 1,595,579; 1,720,774; 2,232,462; 2,232,463 and 2,232,467 corresponding to U.S. Pat. No. 3,510,454 to U.S. Pat. No. 3,541,048, to British patent specification No. 1,393,470 and to U.S. Pat. No. 3,839,283 for example by reacting di-o-hydroxy aryl dicarboxylic acid esters with diisocyanates.

The polybenzoxazin diones are generally sulphonated with chlorosulphonic acid in the presence of halogenated hydrocarbons such as, for example, methylene chloride, chloroform, dichloroethylene and tetrachlorethane. The reaction is carried out at a temperature of from −20° C to the boiling point of the solvent used.

Processes for the sulphonation of aromatic compounds are known per se. They are described, for example, in the chapter entitled "Methoden zur Herstellung aromatischer Sulfonsauren" (Methods of Producing Aromatic Sulphonic Acids) in Houben-Weyl, Methoden der organischen Chemie, Vol IX. However, it had not been expected that polybenzoxazin diones would lend themselves to sulphonation in this way without losing their film-forming properties.

The membranes according to the invention perferably have an anisotropic or asymmetric structure. Asymmetric membranes, according to Loeb and Sourirajan, are characterised by the following structure: a homogeneous and impervious membrane layer of minimal thickness (0.1 to 0.5 μ) merges substantially continuously into a porous underlayer which acts as a substrate or supporting layer and has no effect upon the filtration properties. By contrast, the impervious side of the membrane represents the actual selective separation layer which, by virtue of its minimum thickness, provides for economic throughflow rates. The assymetry of the structure is attributable to the process by which the membrane is formed. Usually, a casting solution of the polymer is prepared in a suitable solvent. A film is drawn from this solution and is subjected to a heat treatment during which the solvent partly evaporates and the asymmetric structrue is formed. The polymer film is then coagulated in a non-solvent as a result of which the structure formed during the heat treatment is consolidated.

Production of the membranes according to the invention generally comprises the following steps:

1. 5 to 35% by weight of the sulphonated polybenzoxazin dione, based on the total quantity of polymer and solvent, are dissolved in a polar aprotic solvent together with from 1 to 10% by weight of an alkali metal or alkaline earth metal salt, preferably LiCl, LiBr, LiNO$_3$, CaCl$_2$, CaBr$_2$, or of an organic amine such as triethyl amine or ethanolamine. Preferred solvents are dimethyl formamide, dimethyl acetamide, N-methyl pyrrolidone, dimethyl sulphoxide, hexamethyl phosphoric acid triamide and mixtures thereof. Heat may optionally be applied in order to accelerate dissolution. The solution is then filtered.

2. The solution thus prepared is applied to a glass or metal substrate or to any other suitable substrate such as, for example, a moving belt or a drum, in a layer thickness of from 150 to 500 μ.

3. This film is then subjected to a heat treatment at temperatures of from 40° to 150° C over a period ranging from 2 to 60 minutes.

4. After a cooling phase lasting 10 minutes, the film is immersed in a coagulation bath and left there for 30 minutes. Suitable coagulation liquids are solvents which are miscible with the organic solvent and, at the same time, are able to dissolve the inorganic salt, but which are non-solvents for the polymer. Solvents which meet these requirements are water, methanol, ethanol and isopropanol. Water is preferably used as the coagulation liquid. The temperature of the coagulation bath may be in the range of from 0° C to 50° C and is preferably in the range of from 0° C to 25° C.

The membranes according to the invention may be used in the form of flat membranes, in tubular form or even in the form of hollow fibres for the selective inverse osmosis of low molecular weight organic substances.

EXAMPLE 1 a. 14.7 g of a polybenz-1,3-oxazin-2,4-dione having the following structure:

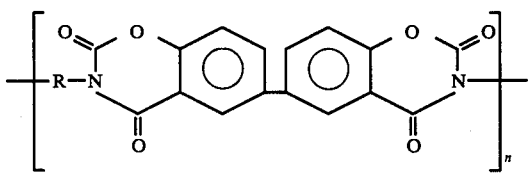

in which R represents a phenylene ether radical of either of the two formulae:

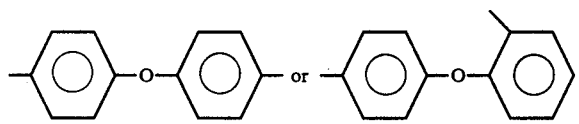

the two phenylene ether radicals being present in a molar ratio of 8 : 2, are swelling under reflux for 2 hours in 200 ml of methylene chloride. After cooling to -5° C, 7 g of chlorosulphonic acid in 20 mol of methylene chloride are added over a period of 1 hour at that temperature. The reaction mixture is allowed to return to room temperature and is then heated under reflux for 1 hour. The product is filtered off under suction, washed with methanol and suspended in water. The product is isolated and dried at 50° C in a vacuum drying cabinet. 15.1 g of a sulphonated polybenzoxazin dione are obtained. The polymer has a relative viscosity $\eta_{rel}$ of 1.441 (the relative viscosities were measured at 25° C on solutions of 5 g of the polymer in 1 liter of dimethyl formamide) and a sulphonic acid content of 0.15 mole of $-SO_3H$ per structural unit.

b. A casting solution is prepared at 80° to 100° C from 10 g of the sulphonated polybenzoxazin dione prepared in accordance with (a), 3 g of $CaCl_2$ and 87 g of dimethyl acetamide. The solution is filtered and freed from residual air bubbles. A 250 μ thick film is applied to a glass plate and subsequently treated on a heating plate for 10 minutes at 50° C in the presence of circulating air. After a cooling phase of 10 minutes, the film together with its substrate is immersed in an ice water bath and left there for a period of 30 minutes, during which the film detaches itself from the glass plate. The film is stored in water until it is required for use.

c. The membrane was tested in an inverse osmosis apparatus, in which the untreated solution was circulated at the surface of the membrane under a pressure of 40 bars and at a pump output of 30 l/h. The tests were carried out at 25° C. The pressureosmosis apparatus was filled with an aqueous solution containing 7 % of NaCl and 2% of a mixture of sodium $C_{12}$-$C_{18}$ alkyl mono- and dialkylsulfonates. The membrane as prepared above was tested under the conditions specified and showed a retention capacity for sulphonates of 94% and for NaCl of 23% for a water throughflow of 120 l/m²d.

EXAMPLE 2 a. 14.7 g of the polybenzoxazin dione defined in Example 1 are sulphonated with 17.5 g of chlorosulphonic acid in the same way as described in Example 1. A sulphonated polybenzoxazin dione with a relative viscosity $\eta_{rel}$ of 1.241 and a sulphonic acid content of 0.73 mole of $-SO_3H$ per structural unit, is obtained.

b. A solution is prepared from 12.1 g of the polymer obtained in accordance with (a), 3.0 g of $CaCl_2$, 51.0 g of dimethyl acetamide and 33.9 g of N-methyl pyrrolidone and casted into a film. This film treated for 20 minutes at 50° C gives the following results when tested under the same conditions as in 1C; a retention capacity for the above described sulphonates of 96% and a salt retention of 0. The water throughflow amounted to 290 l/m²d.

The results of various tests 3 - 8 are set out in the following Table. The polymer used to prepare the membrane is the sulfonated polymer obtained according to 2a and 2b. The membranes are tested as described under 1C.

| Test No. | Casting Solution | Thickness of cast film [μ] | Drying Conditions | Throughflow [l/m²d] | Retention Capacity [%] Sulphonate | NaCl |
|---|---|---|---|---|---|---|
| 1 | 10% polymer, 3% CaCl₂, DMAc | 250 | 10 mins/50° | 120 | 96 | 23 |
| 2 | 12% polymer, 3% CaCl₂, DMAc/NMP | 250 | 20 mins/50° | 290 | 96.5 | 0 |
| 3 | 10% polymer, DMAc 6   4 | 250 | 10 mins/43° | 60 | 98.6 | 28.5 |
| 4 | 10% polymer, 2.5% CaCl₂, DMAc | 250 | 5 mins/50° | 190 | 91.7 | 16.5 |
| 5 | 10% polymer, 3% CaCl₂, DMAc | 250 | 10 mins/43° | 350 | 80 | 0 |
| 6 | 10% polymer, 3% CaCl₂, DMAc | 250 | 20 mins/50° | 240 | 90.3 | 0 |
| 7 | 10% polymer, 3% CaCl₂, DMAc/NMP 9   1 | 250 | 20 mins/50° | 135 | 93 | 0 |
| 8 | 10% polymer, 4% CaCl₂, DMAc | 250 | 20 mins/43° | 380 | 82 | 0 |

DMAc = dimethyl acetamide
NMP = methyl pyrrolidone

We claim:

1. A semipermeable membrane of a sulphonated polybenze-1,3-oxazin-2,4-dione, said dione having a relative viscosity of from 0.7 to 3.5 measured as a 0.5% by weight solution of dimethyl formamide at 25° C, an acid number of from 1 to 800 and a structure of the formula

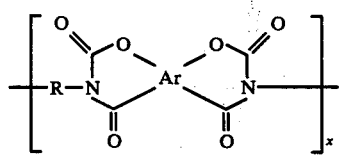

wherein R is

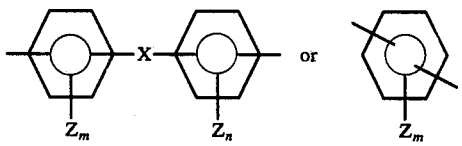

wherein X is a bond, —O—, —S—, —SO$_2$—, —C(CH$_3$)$_2$— or —CH$_2$—; Ar is

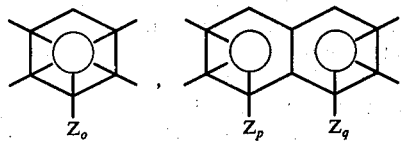, or

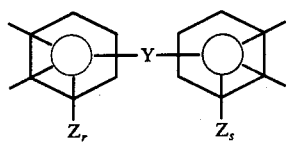

wherein Y is a bond,
—O—, —S—, —CH$_2$—, —SO$_2$—, or —CO—;
Z is —SO$_3$H, a monovalent radical of a sulphonic acid salt of an alkali metal, of an alkaline earth metal or of an organic amine; $m$, $n$, $o$, $p$, $q$, $r$ and $s$ are the same or different; $m$ and $n$ are 0 to 4; $o$, $p$ and $q$ are 0 to 2; $r$ and $s$ are 0 to 3 and their sum is greater than 1, and $x$ is 10 to 200.

2. A membrane of claim 1 in the form of a film, tubular foil or hollow fiber.

3. In the process of selective inverse osmosis of low molecular weight organic substances employing a semipermeable membrane, the improvement wherein the semipermeable membrane of claim 1 is employed.

* * * * *